(12) United States Patent
Walker et al.

(10) Patent No.: US 9,364,783 B2
(45) Date of Patent: Jun. 14, 2016

(54) BANKED PURIFICATION SYSTEM

(71) Applicants: Brian Walker, Washington (GB); Mark Reeves, Washington (GB); Simon Wise, Washington (GB)

(72) Inventors: Brian Walker, Washington (GB); Mark Reeves, Washington (GB); Simon Wise, Washington (GB)

(73) Assignee: WALKER FILTRATION LTD, Tyne & Wear (GB)

( * ) Notice: Subject to any disclaimer, the term of this patent is extended or adjusted under 35 U.S.C. 154(b) by 134 days.

(21) Appl. No.: 14/193,721

(22) Filed: Feb. 28, 2014

(65) Prior Publication Data

US 2014/0245890 A1   Sep. 4, 2014

(30) Foreign Application Priority Data

Mar. 1, 2013   (GB) .................................... 1303693.4

(51) Int. Cl.
*B01D 53/04*   (2006.01)

(52) U.S. Cl.
CPC ........ *B01D 53/0423* (2013.01); *B01D 53/0407* (2013.01); *B01D 53/0446* (2013.01); *B01D 2256/10* (2013.01); *B01D 2257/104* (2013.01); *B01D 2257/504* (2013.01); *B01D 2257/80* (2013.01); *Y02C 10/08* (2013.01)

(58) Field of Classification Search
CPC ........... B01D 53/0407; B01D 53/0423; B01D 53/0446; B01D 2256/10; B01D 2257/104; B01D 2257/504; B01D 2257/80; Y02C 10/08
USPC ...................................... 96/121, 133; 55/484
See application file for complete search history.

(56) References Cited

U.S. PATENT DOCUMENTS

| | | | | |
|---|---|---|---|---|
| 2,586,670 | A | * | 2/1952 | Lambertsen .................... 96/149 |
| 5,275,642 | A | * | 1/1994 | Bassine ............. B01D 53/0415 |
| | | | | 96/133 |
| 5,405,528 | A | | 4/1995 | Selbie et al. |
| 5,827,354 | A | * | 10/1998 | Krabiell et al. ................... 95/96 |
| 5,948,142 | A | | 9/1999 | Holmes et al. |
| 7,172,693 | B2 | * | 2/2007 | Reid ............................. 210/232 |
| 7,320,725 | B2 | * | 1/2008 | Arno et al. ................... 96/117.5 |
| 2005/0000234 | A1 | * | 1/2005 | Kimbara et al. ............... 62/46.1 |
| 2007/0245899 | A1 | | 10/2007 | Merdzo |
| 2008/0184890 | A1 | * | 8/2008 | Lomax et al. ................... 96/131 |
| 2008/0216661 | A1 | | 9/2008 | Mahoney et al. |
| 2009/0193774 | A1 | | 8/2009 | Zanni et al. |
| 2014/0231367 | A1 | * | 8/2014 | Biltoft et al. .................. 210/806 |

FOREIGN PATENT DOCUMENTS

| | | | |
|---|---|---|---|
| CA | 2023054 | A1 | 2/1992 |
| CH | 424721 | A | 11/1966 |

\* cited by examiner

*Primary Examiner* — Frank Lawrence
(74) *Attorney, Agent, or Firm* — Egbert Law Offices, PLLC

(57) ABSTRACT

A banked purification system having, in flow series, an inlet for entry of a fluid, a bank of two or more purification columns in which the fluid is purified by a purifying component, and an outlet for discharging the purified fluid, the columns being arranged in parallel such that the fluid from the inlet splits at first ends of the columns into respective streams which flow through the columns and recombine at second ends of the columns for onward travel to the outlet; wherein the columns have first ports in the side walls of the columns at the first ends, the first ports being connected to each other such that the first ends are placed in fluid communication to create a manifold from the first ends of the columns which splits the fluid from the inlet into said streams.

32 Claims, 11 Drawing Sheets

BANKED PURIFICATION SYSTEM

CROSS-REFERENCE TO RELATED APPLICATIONS

Not applicable.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The present invention relates to banked purification systems, particularly systems having a bank of two or more purification columns in which fluid is purified by a purifying component.

2. Description of Related Art Including Information Disclosed Under 37 CFR 1.97 and 37 CFR 1.98

Purification columns are commonly used to purify fluids (gases or liquids) by passing the fluid through the column, contaminants or other unwanted parts of the fluid being extracted from the fluid by a purifying component, such as an absorbent, adsorbent, filter etc., contained in the column. For example, purification columns can be used as: compressed air and gas dryers, gas generators (e.g. generation of $N_2$ by removal of $O_2$ and $CO_2$ from air), dust filters, refrigerant filters, vacuum pump filters, oil mist filters, etc.

In banked purification systems, a plurality of purification columns is used to increase the fluid flow capacity, the number of banked columns in a given system depending on the flow rate requirement of the particular application.

Some purifying components can be re-generated in-situ. For example desiccants, such as activated alumina and molecular sieve materials used to remove moisture from compressed air and gas, may be re-generated using pressure swing technology, vacuum technology and/or heat regenerative technology. On the other hand, if the purifying component cannot be re-conditioned in-situ it may have to be replaced at regular intervals. For example, when activated carbon is used to remove hydrocarbon contamination from compressed air and gas, the carbon is generally replaced once spent.

It is common practice to use welded and fabricated carbon steel or stainless steel pressure vessels as purification columns. Typically, such vessels have internal diameters from 4 inches (10.2 cm) to over 72 inches (182.9 cm). Due to their manufacturing processes, they are relatively expensive. Furthermore such pressure vessels have to be manufactured in accordance with codes of practice for pressure equipment. Thus, in recent times, it has become popular to replace large single steel pressure vessels with multiples of smaller diameter extruded aluminium tubes, the tubes being banked for larger flow rates. Such extruded tubes are relatively inexpensive to manufacture.

It is common to use aluminium alloy tube columns with internal diameters of up to a maximum of 6 inches (150 mm), as such diameters tend to fall outside of the scope of some of the common pressure vessel design codes and rules.

The use of such columns results in a flexible, banked purification system in which the number of columns can be varied to reflect the flow rate of fluid which needs processing.

Conventional banked systems use separate top and bottom (inlet and outlet) manifolds between which the bank of columns is sealed and clamped. The process fluid is divided at the inlet manifold into separate streams which then flow through respective columns before recombining at the outlet manifold.

However, the inlet and outlet manifolds can be expensive to manufacture. Further, each manifold requires a fixed number of banked columns, making it inconvenient and expensive to change the flow capacity of the system by varying the number of columns. For example, typical manifolds can be for 2, 4, 6, 8, 10 or 12 banked columns, and if it is desired to vary the flow capacity of the system then some or all of these manifolds would have to be replaced, which is generally cost prohibitive. Furthermore from a manufacturing standpoint the manifolds would either have to be made to order, which extends delivery time or each manifold size would have to be held in stock, which increases stock value. Therefore existing multi-bank systems using top and bottom manifolds are not very flexible in a production environment, as extra components have to be held in stock which in turn increases manufacturing costs.

In addition, a further disadvantage of conventional banked systems can be the complex methods of bolting used to hold the columns in place. This can create substantial assembly costs and more importantly substantial maintenance costs when replacing a purifying component. For example, when a large number of fastening bolts are used, it may be necessary, upon re-assembly, to tighten the bolting in a particular sequence with torque wrenches in order to achieve a uniform clamping force and create pressure tight seals. The manifolds themselves may also be large and cumbersome to remove and/or replace.

Generally, associated pipework is directly connected to the manifolds and this will also have to be dismantled or disconnected during maintenance. With the inevitable re-assembly of the associated pipework, this has further adverse effects on maintenance times and costs.

BRIEF SUMMARY OF THE INVENTION

An aim of the present invention is to provide an improved banked purification system.

In a first aspect, the present invention provides a banked purification system having, in flow series, an inlet for entry of a fluid, a bank of two or more purification columns in which the fluid is purified by a purifying component, and an outlet for discharging the purified fluid, the columns being arranged in parallel such that the fluid from the inlet splits at first ends of the columns into respective streams which flow through the columns and recombine at second ends of the columns for onward travel to the outlet; wherein the columns have first ports in the side walls of the columns at the first ends, the first ports being connected to each other such that the first ends are placed in fluid communication to create a manifold from the first ends of the columns which splits the fluid from the inlet into said streams.

In this way, an integral inlet manifold can be created within the banked columns. There is thus no need for a separate inlet manifold to be attached to the columns. The absence of a separate inlet manifold connecting all of the columns is advantageous in that the interior of each column can be accessed independently via its first end without the need to remove a separate inlet manifold that opens all the other columns in the bank. The communication between the first ends preferably creates a pressure tight inlet manifold.

The columns may have first end caps at their first ends. Each first end cap can be replaceably removable to allow access for maintenance or replacement of the purifying component in the respective column. The first end caps can be sealed in a pressure tight manner, typically using an O-ring seal and a fastener to fasten the first end cap to its column, examples of suitable fasteners including: bolts, an internal circlip or a threaded connection. In this way, the first end caps can facilitate access to the internal components of individual columns via the first ends of the columns. Alternatively, however, each first end cap can be permanently fixed to the respective first end.

In principle, the system may have a separate outlet manifold of conventional type at the second ends of the columns. However, preferably the columns have second ports in the side walls of the columns at the second ends, the second ports being connected to each other such that the second ends are placed in fluid communication, to create a manifold from the second ends of the columns which recombines the fluid from said streams for onward travel to the outlet. Thus, an integral outlet manifold can also be created within the banked columns. There is then no requirement for a separate outlet manifold. The absence of separate inlet and outlet manifolds results in a banked purification system in which individual columns can easily be removed or added. Varying the overall capacity of the system by changing the number of columns can thus be facilitated. Again, the communication between the second ends preferably creates a pressure tight outlet manifold.

Indeed, more generally, in a second aspect, the present invention provides a banked purification system having, in flow series, an inlet for entry of a fluid, a bank of two or more purification columns in which the fluid is purified by a purifying component, and an outlet for discharging the purified fluid, the columns being arranged in parallel such that the fluid from the inlet splits at first ends of the columns into respective streams which flow through the columns and recombine at second ends of the columns for onward travel to the outlet; wherein the columns have second ports in the side walls of the columns at the second ends, the second ports being connected to each other such that the second ends are placed in fluid communication to create a (preferably pressure tight) manifold from the second ends of the columns which recombines the fluid from said streams for onward travel to the outlet.

The second aspect corresponds to the first aspect except that the manifold is created at the second ends rather than the first ends. The second aspect has similar advantages to the first aspect.

In the system of the first aspect in which an outlet manifold is created, or in the system of the second aspect, the columns may have second end caps at their second ends. Each second end cap can be replaceably removable to allow access for maintenance or replacement of the purifying component in the respective column. The second end caps can be sealed in a pressure tight manner, typically using an O-ring seal and a fastener to fasten the second end cap to its column, examples of suitable fasteners including: bolts, an internal circlip or a threaded connection. The second end caps can facilitate access to the internal components of individual columns via the second ends of the columns. Alternatively, however, each second end cap can be permanently fixed to the respective second end.

In a third aspect, the present invention provides a multi-banked purification system having a plurality of banked purification systems according to the first or second aspect, wherein neighbouring columns from different banks are formed as multi-column unitary bodies.

For example, the multi-banked purification system can be a two bank system, wherein neighbouring columns from the two banks are formed as double-column unitary bodies. In this case, one bank can be on-line while the other bank is being regenerated. For twin tower applications such as pressure swing compressed air and gas driers, a system having double-column unitary bodies can be more cost effective than a system in which the two banks are formed from single-column bodies. In particular, setting up times and machining times can be reduced, as well as other costs such as the cost of applying protective coatings. Double-column unitary bodies are also generally aesthetically preferable to pairs of single-column bodies.

In a fourth aspect, the present invention provides a column for use in the banked purification system of the first or second aspect.

In a fifth aspect, the present invention provides a multi-column unitary body for use in the multi-banked purification system of the third aspect.

Optional features of the invention will now be set out. These are applicable singly or in any combination with any aspect of the invention.

The bank may contain any number of columns, although typically the bank may contain from two to twelve columns.

The purifying component can be a sorbent. Another option, however, is for the purifying component to be assembled entities such as filter elements or cyclonic separators.

The purifying component can be non-replaceable. More typically, however, the purifying component can be replaceable.

For example, the purifying component (e.g. sorbent) may be contained within (typically replaceable) cartridges. Each cartridge may be sealed to the internal diameter of the respective column. This can help to ensure that the fluid flows through the cartridge without by-pass between cartridge and column.

Another option is for the purifying component to be a loose, typically granular, medium, such as a sorbent, which can be filled directly into the columns. This allows the fill content of the columns to be maximised.

According to yet another option, the purifying component (e.g. sorbent) may be loose, typically granular, medium contained within porous or non-porous bags which are inserted into respective columns. The bags typically have thin walls. The outside diameter of the bags may be slightly larger than the inside diameter of the columns such that when settled in position the fluid is encouraged to flow through the medium, without by-pass between bag and column. Each column may have more than one bag. The bags are preferably mechanically fixed in such a way as to prevent blockage of the integral manifold(s).

Each column may include purifying component restraints, such as foraminous discs which may be held in place by springs, to restrict the purifying component to a given part of the column. Such restraints can prevent movement and attrition of the purification component to ensure maximum operating efficiency and are particularly beneficial for horizontal configurations. Additionally, the use of such restraints can aid cartridge insertion by acting as a buffer or shock absorber, but also as an aid to prevent vibration during service.

The or each manifold created inside the columns can be defined by a plurality of interconnected cavities at the ends of the banked columns. For example, each cavity can be formed by a gap between a purifying component restraint and an end cap of a column.

Each port may have a planar engagement surface for connection to the opposing planar engagement surface of a port of a neighbouring column. The planar engagement surfaces can allow slidable movement of neighbouring columns relative to one another along any direction lying within the plane of the surface. This can facilitate column removal, replacement or addition, and can also facilitate the alignment of connected ports of neighbouring columns. Each pair of opposing planar engagement surfaces can have a sealing gasket to provide a fluid-tight seal.

The bank may be arranged such that the fluid flows sequentially through the first column ends of the inlet manifold created therefrom with respective portions of the flow splitting away from the sequential flow to form the parallel streams, and/or the fluid flows sequentially through the second column ends of the outlet manifold created therefrom with respective portions of the flow recombining with the sequential flow from the parallel streams. When there are three or more columns in a bank having such a sequential arrangement, the or each column end other than the first or last column end of the respective manifold has two ports for entry and exit of the sequential flow. Conveniently, the two ports of each such end may oppose each other across the diameter of the column so that the three or more columns together can form a linear bank of side-by-side columns.

The banked purification system may include fasteners to hold pairs of ports from neighbouring columns in fluid tight connection. For example, the fasteners can include bolts acting across neighbouring columns. Additionally or alternatively, associated with each pair of connected ports, the columns may provide respective angled fastening surfaces. The fasteners can then include wedge connectors, each of which is fitted over the angled fastening surfaces of a pair of connected ports and has wedging faces which can urge the angled fastening surfaces together to hold the ports in fluid tight connection. The angle between the fastening surfaces preferably lies in the range from 30° to 70°. Each pair of connected ports preferably has first angled fastening surfaces at one side of the connected ports and second angled fastening surfaces at the opposite side of the connected ports, a first wedge connector being fitted over the first angled fastening surfaces and a second wedge connector being fitted over the second angled fastening surfaces. Conveniently, the wedging faces of the first and second wedge connectors of each pair of connected ports can urge the angled fastening surfaces together under the action of one or more further fasteners (such as bolts) which extend between the first and second wedge connectors. For example, the first and second wedge connectors may be held together by two bolts. Associated with each pair of connected ports, the columns may also provide respective retention grooves, and each wedge connector may have protrusions which slidingly locate in the grooves to hold the wedge connector in position.

As an alternative, or in addition to fasteners such as wedge connectors, pairs of ports from neighbouring columns may be held in fluid tight connection by a male formation provided by one of the columns which slidingly engages (e.g. in the axial direction of the columns) in a female formation provided by the other of the columns. Preferably, each column has a male formation which connects to the female formation of one neighbouring column, and a female formation which connects to the male formation of another neighbouring column. In this way, the columns can be produced as identical components. Many different configurations for the male and female formations are known to those skilled in the art.

The columns may include locating members which fit in matching recesses provided by neighbouring columns to prevent the columns sliding relative to each other. These locating members may be locating pins or tongues, which may fit into corresponding holes or grooves.

The columns of the banked purification system may be configured such that the respective streams have substantially equal flow rates. For example, the columns can have flow restrictors containing orifices which vary in flow area in relation to the distance from the inlet. Preferably, such restrictors are provided by separate elements fitted to the columns. In this way, the columns themselves can be identical components.

The columns may be mounted with their long axes at any angle between vertical and horizontal. However, preferably the columns may be mounted with their long axes substantially horizontal. This can facilitate replacement of the purification component, as it may then be unnecessary to provide overhead access to the columns.

The system may be adapted for operation in high pressure (e.g. compressed air/gas) applications and/or vacuum applications.

Further optional features of the invention are set out below.

BRIEF DESCRIPTION OF THE SEVERAL VIEWS OF THE DRAWINGS

Embodiments of the invention will now be described by way of example with reference to the accompanying drawings in which.

DETAILED DESCRIPTION OF THE INVENTION

Figure 1:
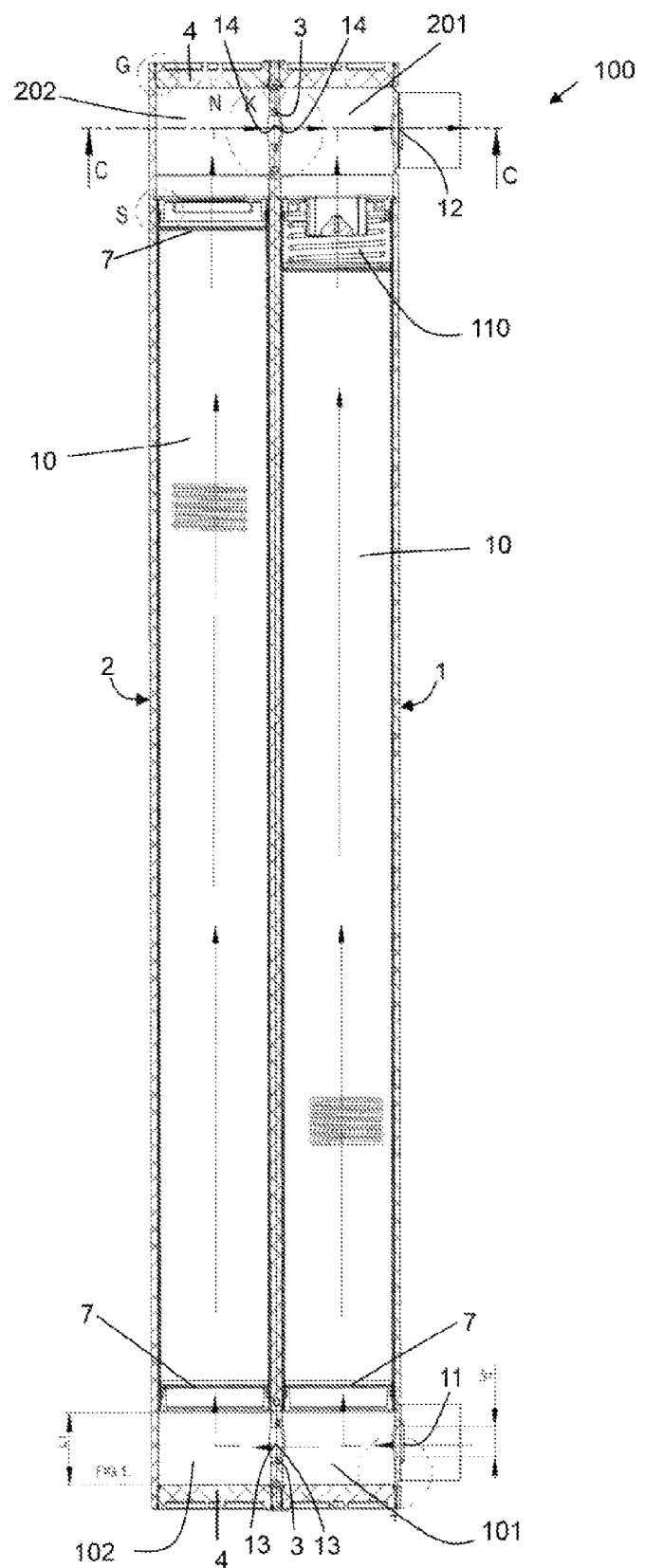
FIG. 1 shows schematically a cross section of two banked columns which are part of a double-banked purification system.

With reference to FIG. 1, a bank 100 of purification columns is shown, the bank being made up of a first column 1 closest to an inlet 11 and an outlet 12, and a parallel, neighbouring second column 2. Any number of further additional columns with opposing port configurations can be sandwiched between the first and second columns to form a larger bank having a flow capacity to suit an intended application. The columns contain a purifying component in the form of sorbent beds 10. Foraminous discs 7 at the ends of the sorbent beds act as restraints to movement of the beds. The columns are terminated at their ends by end caps 4.

The columns 1, 2 are arranged side-by-side with first ports 13 at first (inlet) ends of the respective columns in fluid tight connection with each other to form a first pair of connected ports and second ports 14 in fluid tight connection with each other at second (outlet) ends of the columns to form a second pair of connected ports. An O-ring seal 3 is located between each pair of connected ports. Process control valves (not shown) can be directly attached to the columns in configurations dependent on application. Porting blocks (not shown) can be mounted to the columns to facilitate inlet and outlet piping.

The connection at the first pair of ports 13 places the first ends of the first 1 and second 2 columns in fluid communication to create an integral first (inlet) manifold from the first ends. The inlet manifold splits fluid received from the inlet 11 into respective streams which flow through each of the columns as indicated in FIG. 1 by the vertical arrows. Similarly, the connection at the second pair of ports 14 places the second ends of the first 1 and second 2 columns in fluid communication to create an integral second (outlet) manifold from the second ends. The outlet manifold recombines the fluid streams for onward travel to the outlet 12.

More particularly, the inlet port 11 delivers a flow of fluid into a first manifold cavity 101 within the first end of the first column 1. Differential pressure forces acting across the length of a column cause the fluid flow to split into two parts: the first part forms the stream which travels through the length of the column through the sorbent bed 10, and the second part flows from the first manifold cavity 101 into a second manifold cavity 102 located within the first end of the neighbouring second column 2. Flow out of the second manifold cavity then forms the stream which travels through the second column 2. The fluid streams through the parallel columns 1, 2 have substantially equal flow rates (as discussed in more detail below). The streams recombine at the second ends of the columns via further manifold cavities 201, 202 of the second manifold before flowing through outlet port 12.

The size of each manifold cavity 101, 102, 201, 202 is determined by the diameter of the column 1, 2 and by the gap between the respective end cap 4 and the respective foraminous disc 7. Generally, the gap spacing is substantially greater than the flow cross-sectional areas of the inlet port 11, outlet port 12 and the first 13 and second 14 ports to ensure little resistance to fluid flow in the cavities and sufficient space for sealing of the end cap 4 and the foraminous disc 7.

The purifying component shown in FIG. 1 is formed by sorbent beds 10.

Although the cross section of FIG. 1 pertains to a double-banked purification system, the features it displays are applicable also to the bank of columns from a single-bank purification system, or to a bank of columns from a multi-banked purification system having three or more banks of columns.

Figure 2:
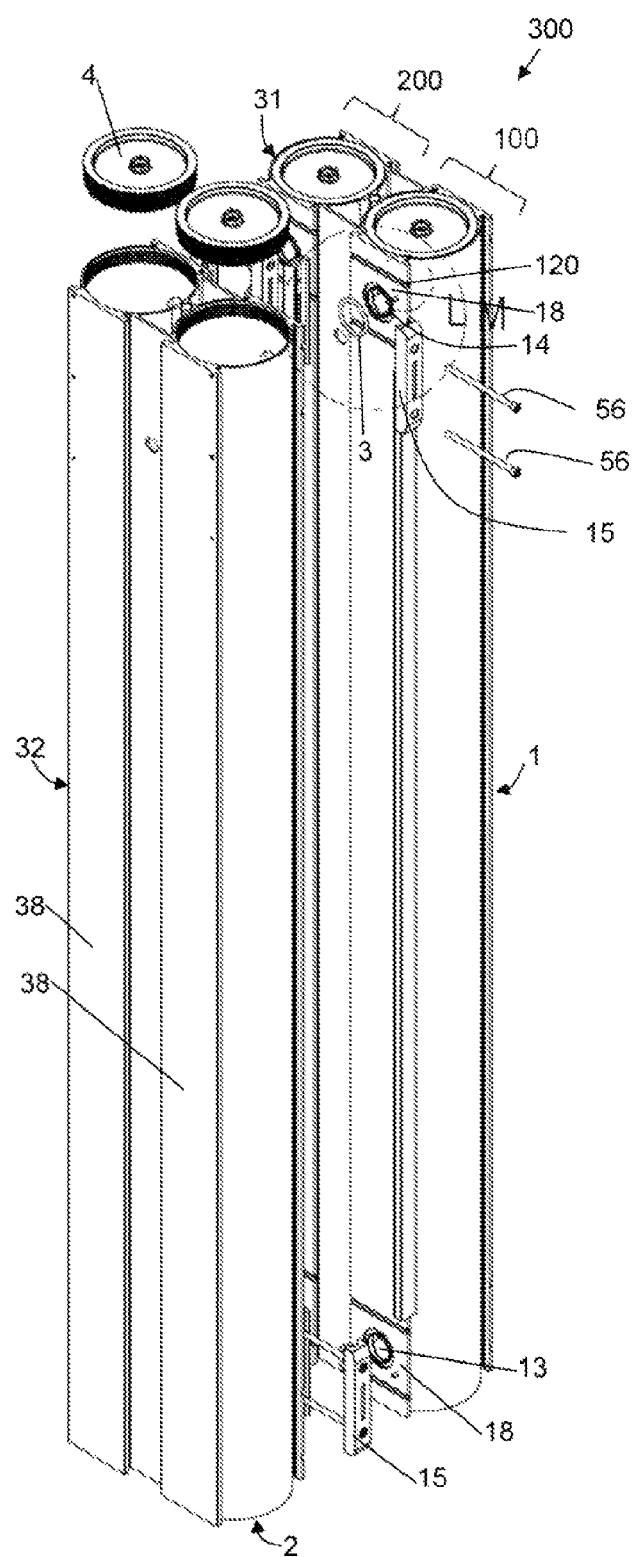
FIG. 2 shows schematically an exploded perspective view of the double-banked purification system of FIG. 1.

As shown in FIG. 2, the bank 100 of purification columns 1, 2 is part of a double-banked purification system 300. More particularly, each column is one half of an extruded, two-column (i.e. duplex) unitary body. Each column has its own first 13 and second 14 ports, end caps 4 and sorbent bed 10. One column 1, 2 of each duplex extrusion is part of the first bank 100, and the other column 31, 32 of each duplex extrusion is part of a second bank 200 which is formed in the same way as the first bank. Having two banks allows one bank to be operationally on-line while the sorbent beds of the other bank are regenerated.

Figure 3:
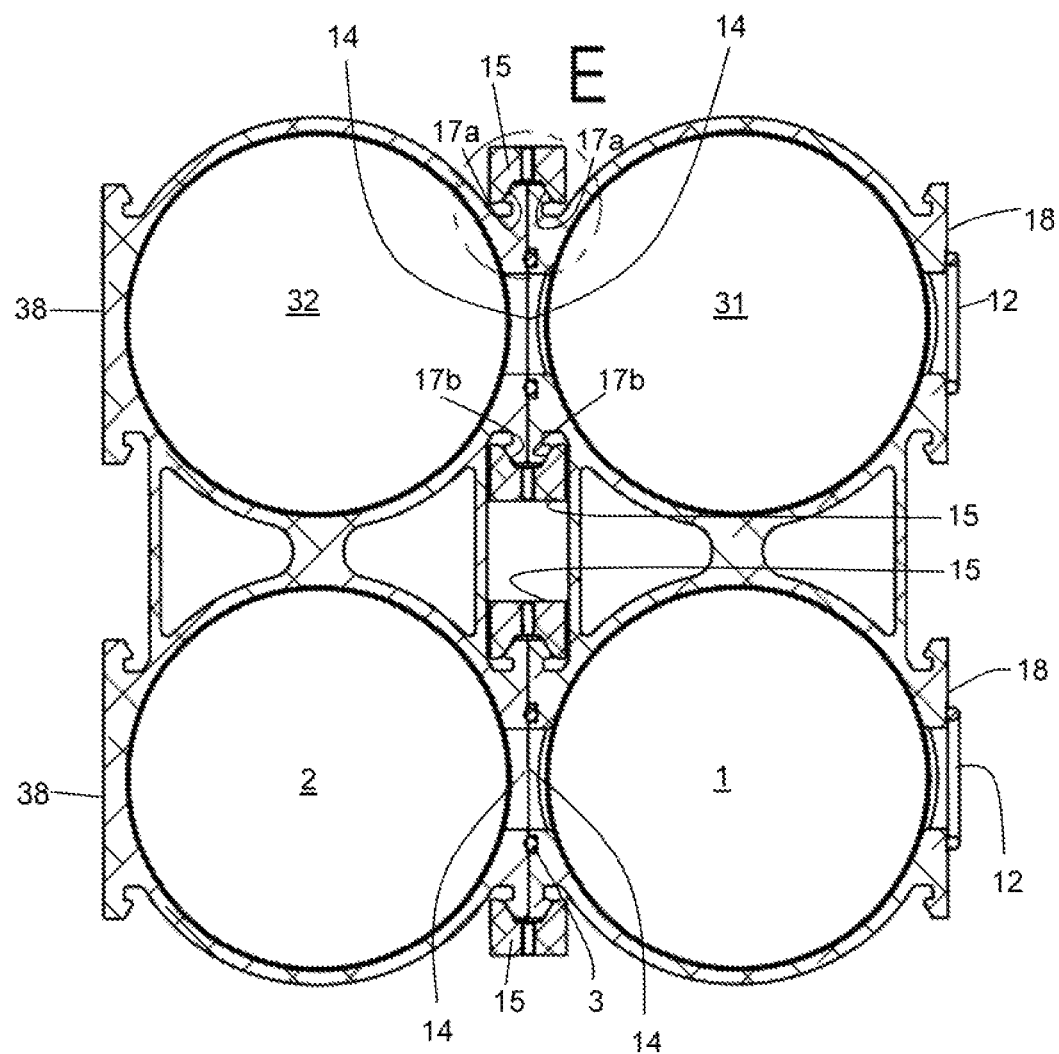
FIG. 3 shows schematically a cross section of the double-banked purification system of FIG. 1 taken along dashed line C-C of FIG. 1.

The second (outlet end) ports 14 of the first 1, 31 and the second 2, 32 columns are shown in more detail in FIG. 3 which is a cross section along line C-C of FIG. 1. The first (inlet end) ports 13 are similarly configured and connected.

Associated with each port 13, 14 is a planar engagement surface 18. Each of these surfaces contacts the opposing planar engagement surface of a port of the neighbouring column. The surfaces allow slidable movement of one of the columns relative to the other along any direction lying within the plane of the surface. This facilitates column removal and replacement, and also facilitates the alignment of ports of neighbouring columns.

Port 11 and port 13 at the inlet ends of the first columns 1, 31 oppose each other across the diameter of the respective column. Likewise, port 12 and port 14 at the outlet ends of these columns oppose each other across the diameter. Such a port arrangement allows further similar columns (i.e. in the form of duplex extrusions) to be added to the banks 100, 200 to extend the lines of columns in the banks. For example, a further column can be added between the first column 1 and the second column 2 of the first bank 100, or at the inlet/outlet port side of column 1 (in which case the inlet 11 and outlet 12 ports of the first column become first 13 and second 14 ports connecting to the further column).

As the columns 1, 2, 31, 32 are produced by extrusion, it is convenient for the planar engagement surfaces 18 on one side of a column to be formed as part of a continuous planar surface which extends the whole length of the column.

The second columns 2, 32 are at the ends of their respective banks 100, 200, distal from the inlet 11 and outlet 12 ports. These columns do not have ports which oppose each other across the column diameter, but rather have first 13 and second 14 ports at one side only for connection to the first columns 1, 31. At the other side of each of the second columns is a continuous planar surface 38 formed during the extruding process, but with no ports machined therein. An alternative possibility, however, is to use columns in the distal position with diametrically opposing ports (as the first columns), but with the ports at the distal side of the columns blanked off. This allows all the columns to be of identical type, reducing stockholding requirements.

The first 1 and second 2 columns of the first bank 100 are held together across their respective connecting ports 13, 14 by fasteners in the form of wedge connectors 15 and bolts 56 (the bolts being shown in FIG. 2, but not in FIGS. 1 and 3). Each wedge connector 15 is fitted over a pair of angled fastening surfaces 17a, 17b associated with the connecting ports. The first 31 and second 32 columns of the second bank 200 are held together in the same way.

Figure 4:
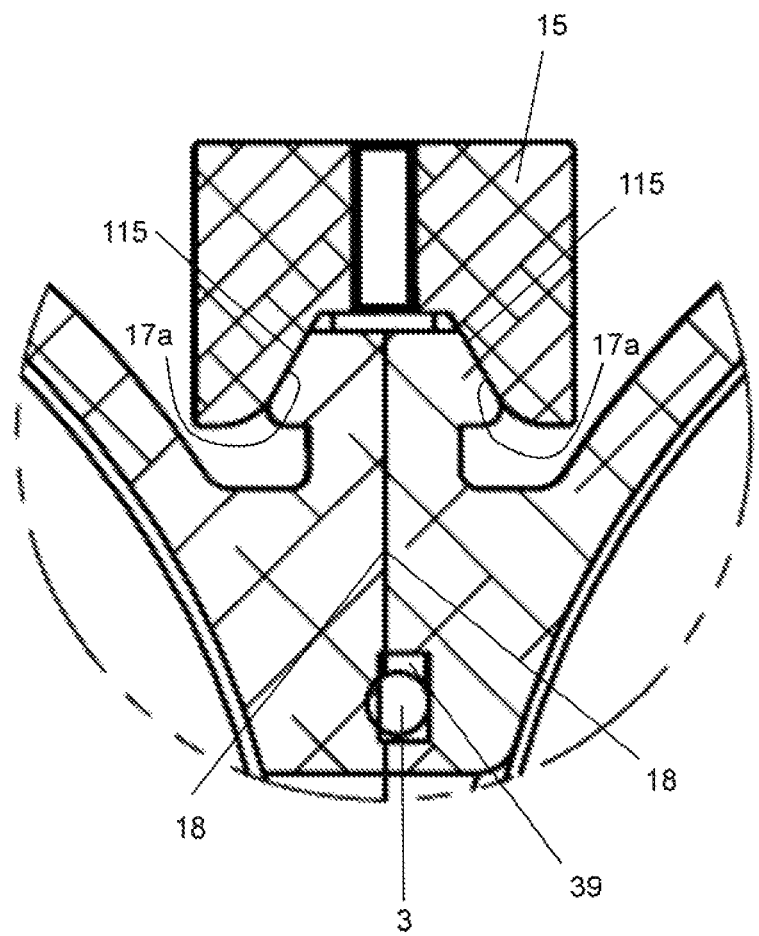
FIG. 4 shows an enlarged view of the circled region E of FIG. 3.

FIG. 4 shows an enlarged view of the circled region E of FIG. 3. Each angled fastening surface 17a, 17b is formed at the edge of the planar engagement surface 18 of a respective port 13, 14. Each port has a fastening surface 17a at one side and a fastening surface 17b at the other side. In this way, when two ports are joined, the fastening surfaces 17a of the two ports oppose each other across the interface between the contacting engagement surfaces 18, and the fastening surfaces 17b similarly oppose each other. One wedge connector 15 is fitted over opposing fastening surfaces 17a and another wedge connector 15 is fitted over opposing fastening surfaces 17b. The two wedge connectors are pulled together under the action of the bolts 56 which extend between the wedge connectors, and which are housed in channels 120. Wedging faces 115 of the wedge connectors urge the fastening surfaces together, compressing O-ring seal 3 located in circular groove 39 formed in one of the engagement surfaces 18.

The angle between the opposing fastening surfaces 17a, 17b over which each wedge connector 15 is fitted preferably lies in the range from 30° to 70°.

Figure 5:
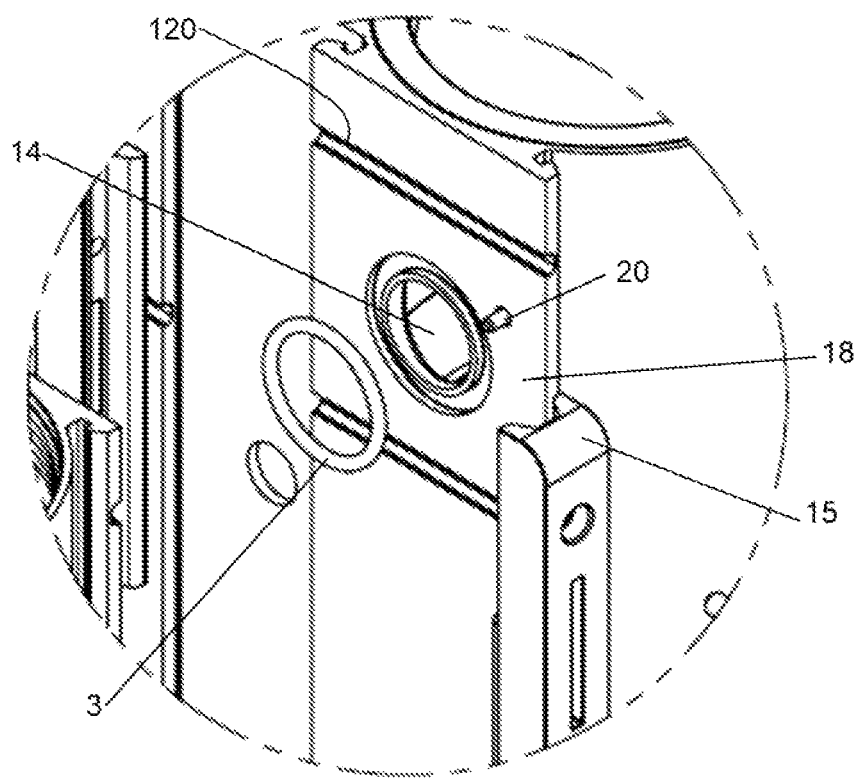
FIG. 5 shows an enlarged view of the circled region M in FIG. 2.

FIG. 5 shows an enlarged view of the circled region M of FIG. 2. For each pair of connecting ports 13, 14 a locating member 20 in the form of a dowel pin projecting from one engagement surface 18 sits in a matching recess (not shown in FIG. 5) formed in the other engagement surface 18. When used in conjunction with the wedge connectors 15, the locating members and recesses produce an extremely rigid construction.

Figure 6:
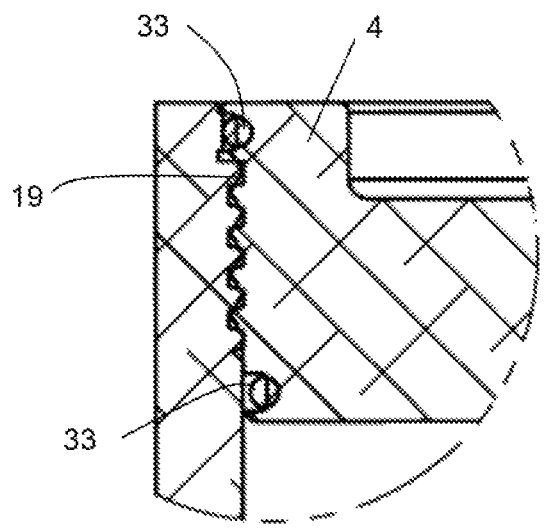
FIG. 6 shows an enlarged view of the circled region G of FIG. 1.

FIG. 6 shows an enlarged view of the circled region G of FIG. 1 and illustrates in more detail features of the end cap 4. The end cap includes a screw thread 19 which mates with a corresponding screw thread on the inner wall of the column 2. Two O-rings 33 positioned above and below the screw thread 19 produce a fluid tight seal.

Figure 7:
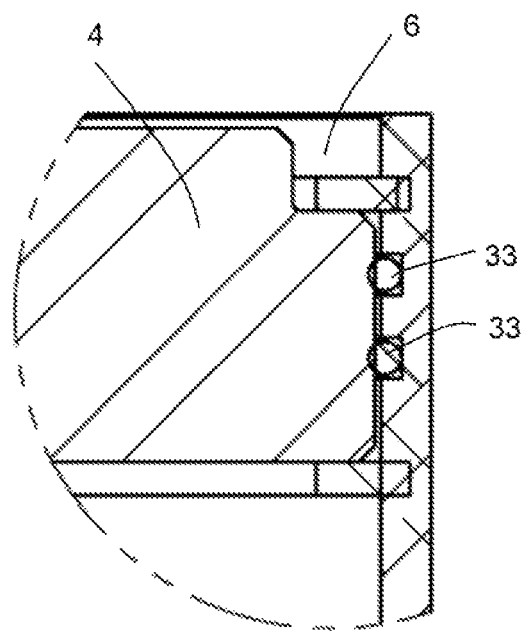
FIG. 7 shows schematically an enlarged cross section of a column illustrating a seal at an end cap.

FIG. 7 shows another option for attaching the end cap 4 to the column 2. In this case, a circlip 6 is mounted against the inner wall of the column at the top of the end cap to hold the cap in place. Again, O-rings 33 ensure a fluid tight seal.

Figure 8:
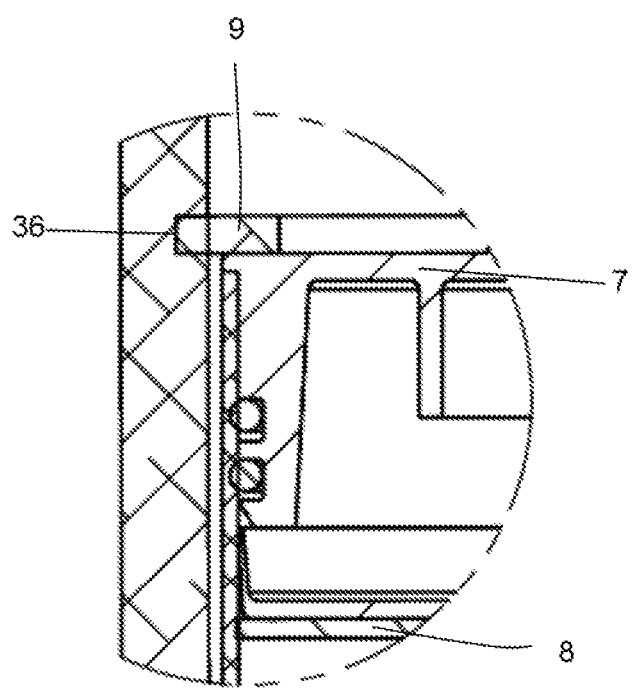
FIG. 8 shows an enlarged view of the circled region S of FIG. 1.

As shown in FIG. 1, the second column 2 has circlip arrangements at the top and the bottom of the sorbent bed 10 to keep the foraminous discs 7 in place. More particularly, as shown in FIG. 8, which is an enlarged view of the circled region S in FIG. 1, a circlip 9 located in groove 36 prevents movement of the upper foraminous disc 7 away from the sorbent bed. A disc 8 of fine fibrous dust-collecting filter material may be sandwiched between the foraminous disc and the sorbent bed.

However, FIG. 1 illustrates a variant arrangement in respect of the first column 1 in which a circlip 9 is used at the bottom of the sorbent bed 10, but a spring loaded mechanism 110 is used at the top of the bed. The mechanism helps to reduce attrition of the sorbent bed by the fluid stream. Spring loaded sorbent beds are particularly preferred when the columns are used in a horizontal position.

Figure 9:
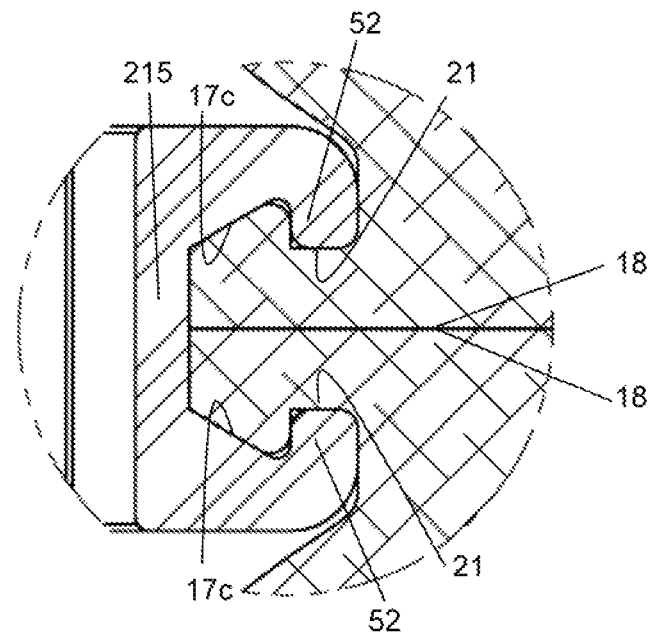
FIG. 9 shows schematically an example of a fastener in the form of a wedge connector having protrusions which slidingly locate in retention grooves of the column.

FIG. 9 shows a variant wedge connector 215 having protrusions 52. This wedge connector is used in conjunction with pairs of connected ports 13, 14 that have retention grooves 21 located behind their angled fastening surfaces 17c. The wedge connector 215 fits over the opposing angled fastening surfaces of a pair of connected ports by slidingly locating the protrusions 52 in the retention grooves 21. When the wedge connector 215 is sufficiently strong and rigid, and bears with sufficient force on the fastening surfaces 17c, the connector can hold the ports in fluid tight connection without recourse to e.g. bolts to pull opposing wedge connectors together bolts.

The wedge connector 215, e.g. when manufactured as a coloured plastic extrusion, can be used as an aesthetic plastic trim.

Figure 10:
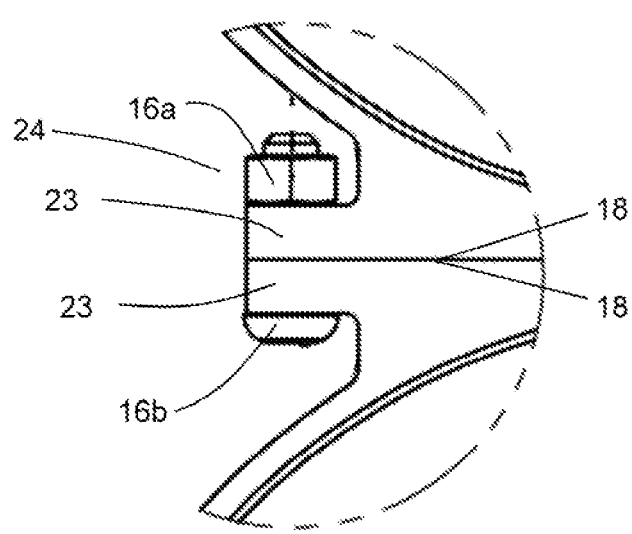
FIG. 10 shows schematically a plan view of an alternative fastener in the form of a nut and bolt.

FIG. 10 shows another possibility for the fasteners which hold the ports 13, 14 together. In this case, the fasteners are in the form of nuts 16a and bolts 16b located at flanges 23 forming the edges of the engagement surfaces 18. The flanges can be of simple configuration as they do not need to provide angled fastening surfaces.

Figure 11:
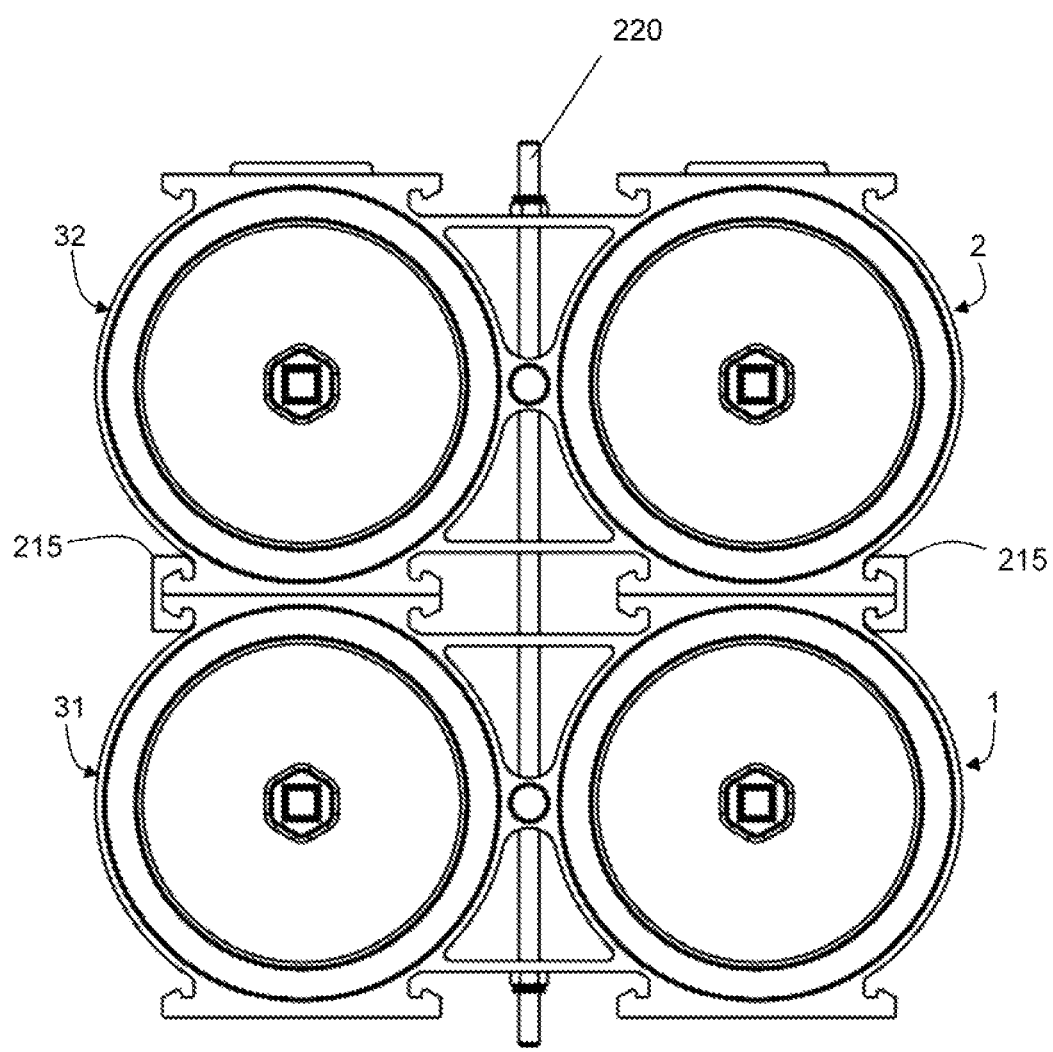
FIG. 11 shows schematically a plan view of two duplex-column unitary bodies utilising threaded stud fasteners to clamp the duplex columns together.

FIG. 11 shows an additional fastener 220 for holding the columns together in the form of a stud or bolt with associated nuts, the stud or bolt extending perpendicularly to the engagement surfaces 18 and lying in the centre plane of the duplex extrusions. One such stud or bolt can be positioned at first ends of the columns 1, 2, 31, 32, and another similar bolt at the second ends. Wedge connectors 215 may also be used.

Figure 12:
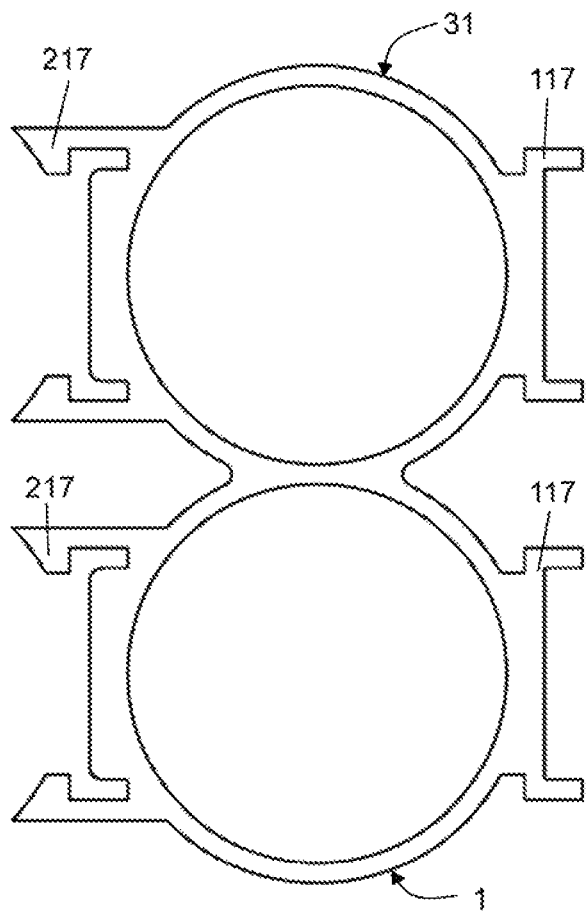
FIG. 12 shows schematically a plan view of a duplex-column unitary body having slidable male and female formations.
Figure 13:
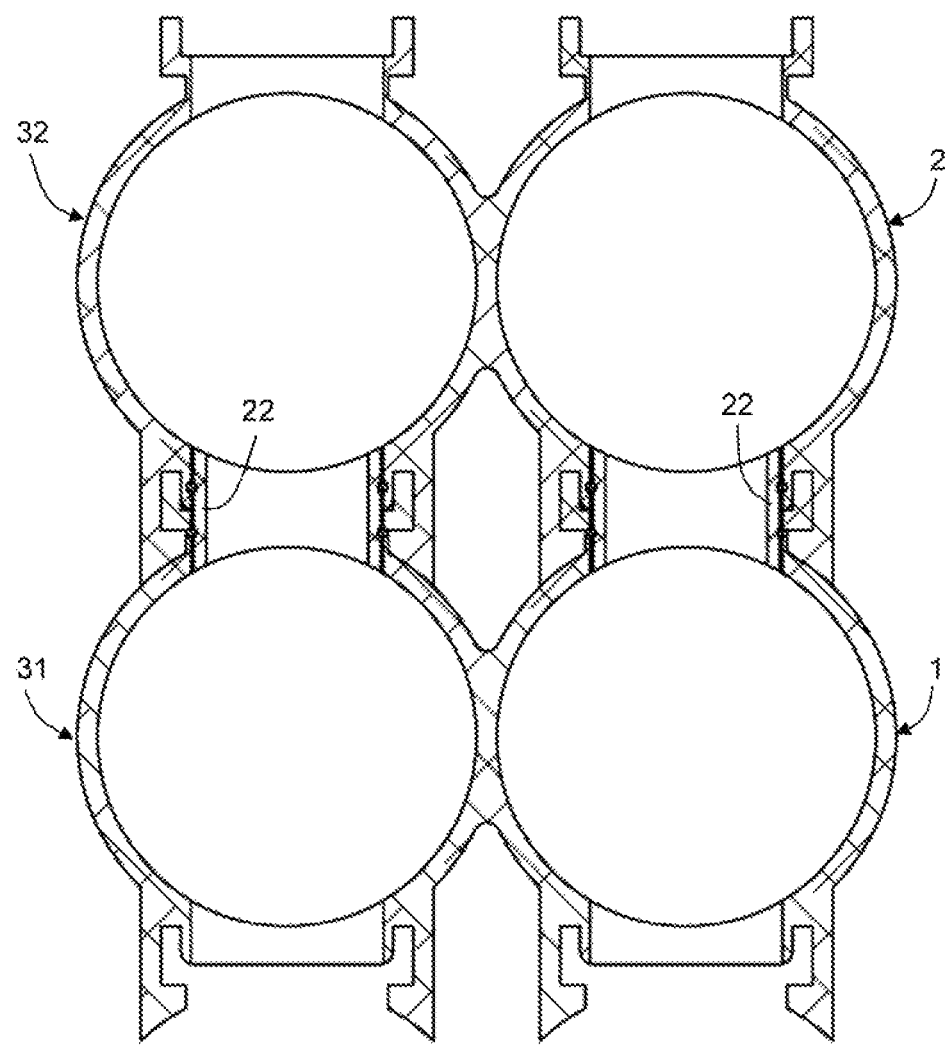
FIG. 13 shows schematically a plan view of two slidingly engaged duplex-column unitary bodies of FIG. 12 complete with tubular port adaptors with double O-ring seals.

FIG. 12 shows schematically a plan view of a duplex unitary body having male 117 and female 217 formations as an alternative or a supplement to fasteners such as wedge connectors. FIG. 13 shows schematically a plan view of two connected duplex bodies of the type shown in FIG. 12. The first 1, 31 and second 2, 32 columns are held in fluid tight connection by the male formation 117 which slidingly engages (in the axial direction of the columns) into the female formation 217 of the neighbouring column. In this way, columns can be locked together without the need for wedge connectors or other similar types of fasteners.

As shown in FIG. 13, tubular adaptors 22, positioned in the connected ports and provided complete with double O-ring seals, lie across the engaged male/female formations substantially perpendicular to the longitudinal axes of the columns. Each locating member 22 not only seal the two columns together but reduces or eliminates unwanted slippage of one unitary body relative to a neighbouring unitary body.

A bonding agent such as epoxy resin can be applied to the planar engagement surfaces 18 of pairs of ports 13, 14. The agent can act as a lubricant when joining columns together, reducing the risk of galling when bringing a first column 1, 31 into alignment with a neighbouring second column 2, 32. The bonding agent can also provide an extremely rigid structure, e.g. once the resin has hardened, reducing or avoiding a need for structures such as the locating member 22.

When each bank contains a large number of columns, it can be advantageous to promote the same pressure drop across all the columns of the bank, and thereby to help ensure that the streams through the columns have substantially equal flow rates.

For example, as the fluid flows from the inlet sequentially through the column ends of the integral inlet manifold it will naturally take the path of least resistance, potentially causing preferential flow through some of the columns. Also the fluid pressure will tend to drop as a result of losses produced by the passage through each pair or connected ports. To address these characteristics, each column may have a flow restrictor to balance the pressure loss across its ports, and in this way control the flow from the inlet manifold through the purifying component of each column. The flow restrictors can be of various designs and complexity, depending on the application requirement. For instance they can be configured as variable area orifices varying in size from the first column to the last column so that there is less resistance to flow through the columns furthest from the inlet than through the columns closest to the inlet. Another option is to use pressure sensitive valves on each column to take into consideration varying flow conditions. As the pressure drop across the purification component is generally significantly higher than pressure drop within the integral manifolds, yet another option is to adjust the configuration or packing of the purification component within the columns to evenly split the fluid flow.

Typically, the columns are mounted with their long axes vertically, whereby it is usually necessary to ensure that there is sufficient overhead access available for replacing the purification component. However, an advantage of the banked purification system of the present invention is that it is possible to mount the columns with their long axes horizontally, thereby facilitating easy replacement of the purification component.

This application preferably makes use of pressure-retaining extruded columns which normally have a circular bores. However, oval, regular or irregular polygonal, or other shaped bores are possible. The thicknesses of the column walls can be in accordance with international pressure vessel standards. A typical diameter of a circular bore is 150 mm or less.

It is envisioned that most systems in accordance with the present invention will use extruded aluminium alloy columns, but other materials including extruded plastic columns can also be used, particularly for low pressure applications.

Where the purifying component is a loose sorbent, it is preferred that the sorbent, which is normally in a granular form, is snow storm filled directly into the columns or into its container (e.g. cartridge or bag) to maximize the fill ratio.

Examples of suitable sorbents include: activated alumina, activated carbon, and zeolites. However, the sorbent may be any suitable material, and is generally chosen based upon application requirements (e.g. gas drying, gas enrichment and separation, contamination removal).

While the invention has been described in conjunction with the exemplary embodiments described above, many equivalent modifications and variations will be apparent to those skilled in the art when given this disclosure. For example, the flow can be top to bottom, rather than bottom, as shown in FIG. 1. Further, the columns can be mounted horizontally for horizontal flow. Accordingly, the exemplary embodiments of the invention set forth above are considered to be illustrative and not limiting. Various changes to the described embodiments may be made without departing from the spirit and scope of the invention.

We claim:

1. A banked purification system comprising, in flow series, an inlet for entry of a fluid, a bank of two or more purification columns in which the fluid is purified by a purifying component, and an outlet for discharging the purified fluid, the columns being arranged in parallel such that the fluid from the inlet splits at first ends of the columns into respective streams which flow through the columns and recombine at second ends of the columns for onward travel to the outlet;
wherein the columns are extruded columns and have first ports in side walls of the columns at the first ends, the first ports being connected to each other such that the first ends are placed in fluid communication to create a manifold from the first ends of the columns, the fluid flowing sequentially through the first ends with respective portions of the flow splitting away from the sequential flow of the first ends so as to form the streams.

2. The banked purification system of claim 1, wherein the columns have first end caps at first ends thereof, each first end cap being replaceably removable so as to allow access for maintenance or replacement of the purifying component in the respective column.

3. The banked purification system of claim 1, wherein the columns have second ports in the side walls of the columns at the second ends, the second ports being connected to each other such that the second ends are placed in fluid communication to create a manifold from the second ends of the columns, the fluid flowing sequentially through the second ends with respective portions of the flow recombining with the sequential flow of the second ends from the streams.

4. The banked purification system of claim 3, wherein the columns have second end caps at second ends, each second end cap being replaceably removable to allow access for maintenance or replacement of the purifying component in the respective column.

5. The banked purification system of claim 1, wherein the purifying component is contained within cartridges.

6. The banked purification system of claim 1, wherein the purifying component is a loose medium filled directly into the columns.

7. The banked purification system of claim 1, wherein the purification component is contained within porous or non-porous bags.

8. The banked purification system of claim 1, wherein each port has a planar engagement surface for connection to an opposing planar engagement surface of a port of an adjacent column.

9. The banked purification system of claim 1, the columns comprising three or more columns, and wherein each column end other than a first or a last column end of the respective manifold has two ports for entry and exit of the sequential flow, the two ports of each column end opposing each other across a diameter of the column so that the three or more columns together form a linear bank of side-by-side columns.

10. The banked purification system of claim 1, further including fasteners to hold pairs of ports from adjacent columns in fluid tight connection.

11. The banked purification system of claim 10, wherein, associated with each pair of the connected ports, the columns provide respective angled fastening surfaces; and wherein the fasteners include wedge connectors, each of the wedge connectors is fitted over the angled fastening surfaces of the pair of connected ports and has wedging faces which urge the angled fastening surfaces together to hold the ports in fluid tight connection.

12. The banked purification system of claim 11, wherein, associated with each pair of connected ports, the columns provide respective retention grooves, the wedge connector having protrusions which slidingly locate in the retention grooves to hold the wedge connectors in position.

13. The banked purification system of claim 1, wherein pairs of ports from adjacent columns are held in fluid tight connection by a male formation provided by one of the columns which slidingly engages in a female formation provided by another of the columns.

14. The banked purification system claim 1, wherein the columns include locating members which fit in matching recesses provided by adjacent columns to prevent the columns from sliding relative to each other.

15. The banked purification system of claim 1, wherein the columns are mounted with longitudinal axes thereof being substantially horizontal.

16. A multi-banked purification system having a plurality of banked purification systems of claim 1, wherein adjacent columns from different banks are formed as multi-column unitary bodies.

17. An extruded multi-column unitary body for use in the multi-banked purification system of claim 16, each column of the extruded multi-column unitary body having the first ports formed in a side wall of that column at a first end thereof.

18. A banked purification system comprising, in flow series, an inlet for entry of a fluid, a bank of two or more purification columns in which the fluid is purified by a purifying component, and an outlet for discharging the purified fluid, the columns being arranged in parallel such that the fluid from the inlet splits at first ends of the columns into respective streams which flow through the columns and recombine at second ends of the columns for onward travel to the outlet;

wherein the columns are extruded columns and have second ports in side walls of the columns at the second ends, the second ports being connected to each other such that the second ends are placed in fluid communication to create a manifold from the second ends of the columns, the fluid flowing sequentially through the second ends with respective portions of the flow recombining with the sequential flow of the second ends from said streams.

19. The banked purification system of claim 18, wherein the columns have second end caps at second ends thereof, each second end cap being replaceably removable to allow access for maintenance or replacement of the purifying component in the respective column.

20. The banked purification system of claim 18, wherein the purifying component is contained within cartridges.

21. The banked purification system of claim 18, wherein the purifying component is a loose medium filled directly into the columns.

22. The banked purification system of claim 18, wherein the purification component is contained within porous or non-porous bags.

23. The banked purification system of claim 18, wherein each port has a planar engagement surface for connection to an opposing planar engagement surface of a port of a an adjacent column.

24. The banked purification system of claim 18, the columns comprising three or more columns, and wherein each column end other than the first or last column end of the respective manifold has two ports for entry and exit of the sequential flow, the two ports of each column end opposing each other across the diameter of the column so that the three or more columns together form a linear bank of side-by-side columns.

25. The banked purification system of claim 18, further including fasteners to hold pairs of ports from adjacent columns in fluid tight connection.

26. The banked purification system of claim 25, wherein, associated with each pair of connected ports, the columns provide respective angled fastening surfaces; and wherein the fasteners include wedge connectors, each of which is fitted over the angled fastening surfaces of a pair of connected ports and has wedging faces which urge the angled fastening surfaces together to hold the ports in fluid tight connection.

27. The banked purification system of claim 26, wherein, associated with each pair of connected ports, the columns provide respective retention grooves, the wedge connector having protrusions which slidingly locate in the retention grooves to hold the wedge connectors in position.

28. The banked purification system of claim 18, wherein pairs of ports from adjacent columns are held in fluid tight connection by a male formation provided by one of the columns which slidingly engages in a female formation provided by the other of the columns.

29. The banked purification system claim 18, wherein the columns include locating members which fit in matching recesses provided by adjacent columns to prevent the columns sliding relative to each other.

30. The banked purification system of claim 18, wherein the columns are mounted with longitudinal axes thereof being substantially horizontal.

31. A multi-banked purification system having a plurality of banked purification systems of claim 18, wherein adjacent columns from different banks are formed as multi-column unitary bodies.

32. An extruded multi-column unitary body for use in the multi-banked purification system of claim 31, each column of the extruded multi-column unitary body having second ports formed in a side wall of that column at a second end thereof.

* * * * *